US012793683B2

(12) United States Patent
Singh et al.

(10) Patent No.: US 12,793,683 B2
(45) Date of Patent: Nov. 10, 2026

(54) RECONFIGURABLE ACOUSTIC METASURFACE USING A SHARED TUNING ELEMENT FOR CAVITY VOLUME CHANGE

(71) Applicant: Dell Products L.P., Round Rock, TX (US)

(72) Inventors: Tejinder Singh, Manotick (CA); Navjot Kaur Khaira, Manotick (CA); Morris Repeta, Ottawa (CA)

(73) Assignee: DELL PRODUCTS L.P., Round Rock, TX (US)

(*) Notice: Subject to any disclaimer, the term of this patent is extended or adjusted under 35 U.S.C. 154(b) by 101 days.

(21) Appl. No.: 18/811,260

(22) Filed: Aug. 21, 2024

(65) Prior Publication Data

US 2026/0057868 A1 Feb. 26, 2026

(51) Int. Cl.
*G10K 11/172* (2006.01)
*E04B 1/84* (2006.01)
(Continued)

(52) U.S. Cl.
CPC .................................... *G10K 11/16* (2013.01)

(58) Field of Classification Search
CPC ........ G10K 11/16; G10K 11/172; F01N 1/02; F01N 1/023; F01N 1/16; F01N 1/161;
(Continued)

(56) References Cited

U.S. PATENT DOCUMENTS 4,669,842 A * 6/1987 Yomoda ............. G03F 7/70258 353/101
4,692,727 A 9/1987 Wakino et al.
(Continued)

FOREIGN PATENT DOCUMENTS

CN 103647474 A * 3/2014
CN 104587789 A * 5/2015
(Continued)

OTHER PUBLICATIONS

"APC NetShelter Soundproof, 32U, Server Rack Enclosure, 120V, Maple [TAA]-AR4032A" Schneider Electric. [https://www.se.com/us/en/product/AR4032A/apc-netshelter-soundproof-32u-server-rack-enclosure-120v-maple-taa/] retrieved Feb. 9, 2026, 15 pages.
(Continued)

*Primary Examiner* — Edgardo San Martin
(74) *Attorney, Agent, or Firm* — Amin, Turocy & Watson, LLP

(57) ABSTRACT

The technology described herein is directed towards a metasurface arranged with unit cells for narrowband sound absorption, in which the unit cells are based on Helmholtz resonators that can have their resonant frequencies adjusted via a shared tuning element, e.g., a screw, or a piezoelectric actuator. A sound absorbing unit-cell is designed and constructed based on a general resonance frequency, and includes a neck portion and air chamber dimensioned to resonate close to the desired resonance frequency and thereby inverse phase cancel corresponding narrowband frequencies of incoming sound waves. Collectively moveable floors in the resonators facilitate changing the resonators' air cavity dimensions, to adjust the resonant frequencies to cancel acoustic waves of different frequencies corresponding to noise, which can change over time. The unit cells can be distributed as part of a metasurface, which can be positioned proximate to a noise source to phase cancel the noise.

20 Claims, 12 Drawing Sheets

(51) Int. Cl.

| | |
|---|---|
| ***F01N 1/02*** | (2006.01) |
| ***F01N 1/16*** | (2006.01) |
| ***F04D 29/66*** | (2006.01) |
| ***G10K 11/16*** | (2006.01) |

(58) Field of Classification Search

CPC ...... F01N 1/166; E04B 1/84; E04B 2001/848; E04B 2001/8485; E04B 2001/8476; H05K 7/20136; H05K 7/20709; H05K 7/20736; F04D 29/663; F04D 29/665

See application file for complete search history.

(56) References Cited

U.S. PATENT DOCUMENTS

| | | | | |
|---|---|---|---|---|
| 5,457,291 | A * | 10/1995 | Richardson | G10K 11/172 181/294 |
| 5,598,479 | A * | 1/1997 | Dodt | G10K 11/172 381/71.7 |
| 5,894,823 | A * | 4/1999 | Lee | F02M 35/1222 123/184.57 |
| 5,979,593 | A | 11/1999 | Rice et al. | |
| 6,104,608 | A * | 8/2000 | Casinelli | F24F 13/24 181/224 |
| 6,295,363 | B1 * | 9/2001 | Laak, Jr. | G10K 11/161 381/94.1 |
| 6,732,509 | B2 * | 5/2004 | Shiga | F02M 35/1222 60/314 |
| 6,792,907 | B1 * | 9/2004 | Kostun | F01N 1/065 123/184.57 |
| 7,089,901 | B2 * | 8/2006 | Kino | F02M 35/1261 123/184.57 |
| 7,337,877 | B2 * | 3/2008 | Goenka | F02M 35/1261 181/266 |
| 7,353,908 | B1 * | 4/2008 | French | G10K 11/17861 381/71.5 |
| 7,586,393 | B2 | 9/2009 | Tilmans et al. | |
| 7,891,464 | B2 * | 2/2011 | Tang | F04D 29/663 181/224 |
| 8,149,074 | B2 | 4/2012 | Narhi | |
| 8,869,836 | B2 * | 10/2014 | Miller | B64D 37/10 137/13 |
| 10,181,837 | B2 | 1/2019 | Holyoak et al. | |
| 10,408,230 | B2 * | 9/2019 | Chen | F04D 17/16 |
| 10,415,471 | B2 * | 9/2019 | Marchaj | F02C 7/045 |
| 10,557,417 | B2 * | 2/2020 | Jodet | G10K 11/172 |
| 10,565,974 | B1 * | 2/2020 | Bhatia | G11B 33/08 |
| 10,677,163 | B2 * | 6/2020 | Pastouchenko | F02K 1/827 |
| 10,866,036 | B1 * | 12/2020 | Busche | H05K 7/2039 |
| 11,021,870 | B1 * | 6/2021 | McKnight | E04B 1/84 |
| 2002/0009202 | A1 * | 1/2002 | Sheplak | G10K 11/172 381/71.5 |
| 2017/0141755 | A1 | 5/2017 | Holyoak | |
| 2019/0333492 | A1 | 10/2019 | Lee et al. | |
| 2020/0265822 | A1 | 8/2020 | Egan et al. | |
| 2023/0171532 | A1 | 6/2023 | Wilk et al. | |
| 2023/0235552 | A1 * | 7/2023 | Agarwal | G10K 11/17823 181/284 |
| 2024/0019164 | A1 | 1/2024 | Serenari et al. | |
| 2025/0201225 | A1 | 6/2025 | Singh et al. | |
| 2025/0378809 | A1 * | 12/2025 | Singh | G10K 11/16 |
| 2026/0051307 | A1 * | 2/2026 | Singh | G10K 11/16 |
| 2026/0051308 | A1 * | 2/2026 | Singh | G10K 11/16 |
| 2026/0055780 | A1 * | 2/2026 | Singh | B33Y 80/00 |
| 2026/0055781 | A1 * | 2/2026 | Singh | F04D 29/665 |
| 2026/0057868 | A1 * | 2/2026 | Singh | G10K 11/16 |
| 2026/0057869 | A1 * | 2/2026 | Singh | G10K 11/172 |
| 2026/0058578 | A1 * | 2/2026 | Singh | H02N 2/186 |
| 2026/0059686 | A1 * | 2/2026 | Singh | H05K 7/1488 |

FOREIGN PATENT DOCUMENTS

| | | | | | |
|---|---|---|---|---|---|
| CN | 109102795 | A | * | 12/2018 | G10K 11/04 |
| CN | 109119059 | A | * | 1/2019 | G10K 11/172 |
| CN | 112628517 | A | * | 4/2021 | F16L 55/00 |
| CN | 112669802 | A | * | 4/2021 | |
| CN | 118506757 | A | * | 8/2024 | G10K 11/172 |
| EP | 0875780 | A2 | | 11/1998 | |
| EP | 3156664 | A1 | * | 4/2017 | F01N 1/161 |
| FR | 3163239 | A1 | * | 12/2025 | H04R 1/2811 |
| GB | 2271494 | A | * | 4/1994 | G10K 11/172 |
| KR | 20120044629 | A | * | 5/2012 | B63H 21/32 |
| KR | 20160066883 | A | * | 6/2016 | E04B 1/82 |
| KR | 20210152652 | A | * | 12/2021 | H05H 1/24 |
| KR | 20220023621 | A | * | 3/2022 | G10K 11/172 |
| WO | 0248998 | A1 | | 6/2002 | |
| WO | WO-2024006293 | A1 | * | 1/2024 | F04D 29/665 |

OTHER PUBLICATIONS

"Quiet-Duct® Silencers—A Complete Range of Engineered Noise Control for Air Handling Systems" iac acoustics. [https://www.iacacoustics.com/files/content/literature/hvac-silencers/Duct-Silencer-Brochure.pdf] retrieved Feb. 9, 2026, 8 pages.

L. E. Kinsler, A. R. Frey, A. B. Coppens and V. Sanders James, "Fundamentals of Acoustics", Wiley, 2000, 568 pages.

Singh et al. "Reconfigurable Acoustic Surface Using Microelectromechanical Systems (MEMS) Actuators For Changing Cavity Resonance" U.S. Appl. No. 18/808,961, filed Aug. 19, 2024, 41 pages.

Singh et al. "Acoustic Metasurface With Integrated Actuators For Tuning the Cavity Volume" U.S. Appl. No. 18/809,945, filed Aug. 20, 2024, 38 pages.

Singh et al. "Multi-Function Bimorph Microelectromechanical Systems Integration (MEMS) for Analog Tunability In Metasurfaces" U.S. Appl. No. 18/809,012, filed Aug. 19, 2024, 41 pages.

Non-Final Office Action received for U.S. Appl. No. 18/808,961 dated Apr. 29, 2026, 16 pages.

Non-Final Office Action received for U.S. Appl. No. 18/809,012 dated Apr. 7, 2026, 21 pages.

Non-Final Office Action received for U.S. Appl. No. 18/809,945 dated Apr. 29, 2026, 15 pages.

Final Office Action received for U.S. Appl. No. 18/809,012 dated Jun. 26, 2026.

Final Office Action received for U.S. Appl. No. 18/809,945 dated Aug. 12, 2026, 31 pages.

Final Office Action received for U.S. Appl. No. 18/808,961 dated Aug. 12, 2026, 26 pages.

* cited by examiner

RECONFIGURABLE ACOUSTIC METASURFACE USING A SHARED TUNING ELEMENT FOR CAVITY VOLUME CHANGE

BACKGROUND

Acoustic absorbers are specialized materials or structures designed to mitigate the effects of sound reflections, echoes, and reverberations in various environments. These absorbers function by capturing sound waves and converting their energy into heat, effectively reducing the intensity of the sound waves and preventing them from bouncing off surfaces and causing unwanted sound reflections. They are typically engineered using porous materials with intricate structures that allow sound waves to penetrate deep into the material, where the acoustic energy is dissipated as thermal energy through friction and air resistance.

Existing acoustic absorbers come in various forms, including foam panels, fabric-wrapped panels, diffusers, bass traps, and more. One of the problems with existing acoustic absorbers is that they are not desirable in certain heat-sensitive environments. For example, servers generate a lot of heat and thus are designed with fans to cool dissipate the heat; however, fans can generate a lot of annoying noise. Using existing acoustic absorbers to absorb server noise reduces the noise, but can significantly reduce dissipation of the heat generated by servers, which can result in high heat levels that can reduce server performance and possibly cause a server to shut down to avoid damage from overheating.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
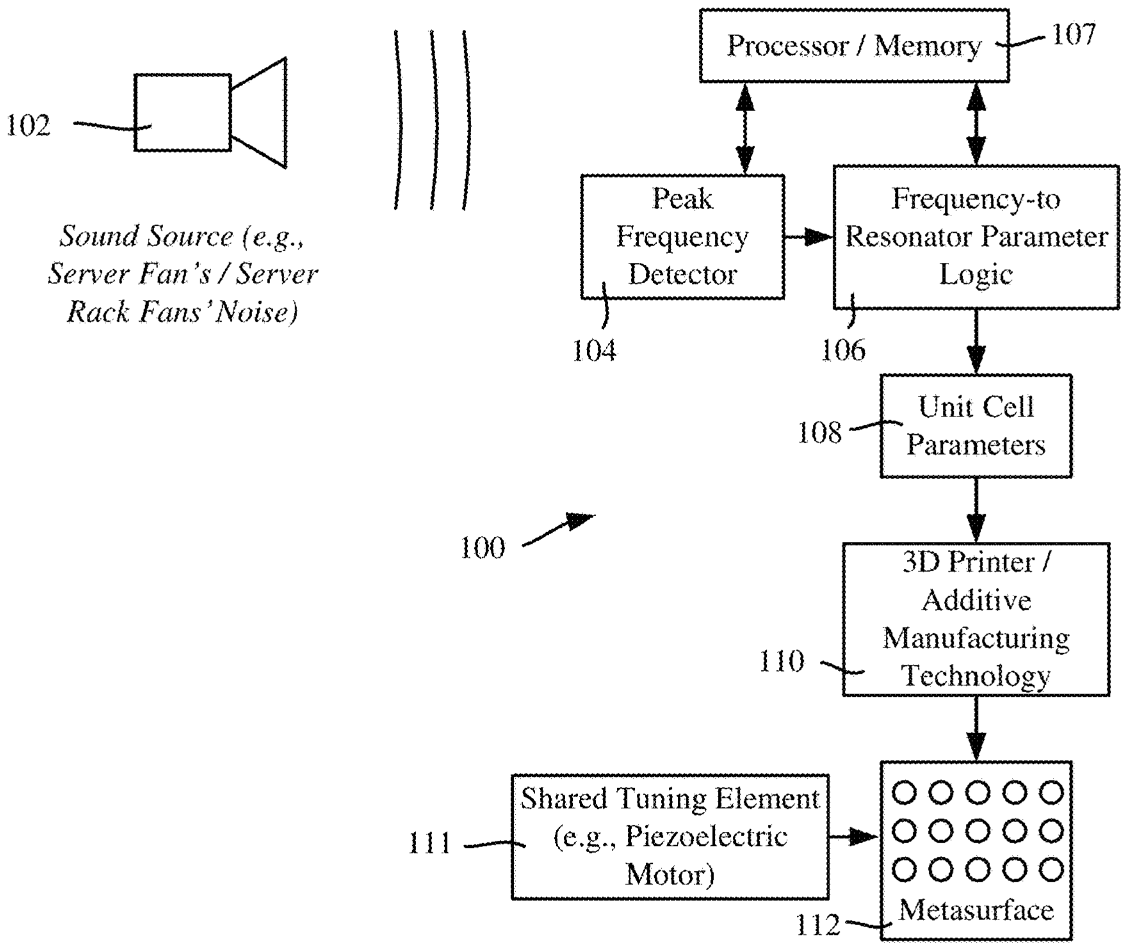
FIG. 1A is a block diagram showing an example system for implementing a metasurface with a shared tuning element for resonating unit cells for noise cancellation by phase canceling a narrowband frequency in acoustic waves, in accordance with various example embodiments and implementations of the subject disclosure.

Various embodiments and implementations of the technology described herein are generally directed towards a sound absorbing device based on inverted phase cancellation, and more particularly towards Helmholtz resonators (unit cells) with variable cavity dimensions, and thus adjustable resonant frequencies, as adjusted by a shared tuning element, e.g., a screw or a piezoelectric actuators. In one implementation, the resonators can be tuned as a single group; in an alternative implementation, different groups of unit cells can be present, e.g., interleaved with one another, with each group independently tuned.

The technology described herein facilitates the design and implementation of such unit cells into metasurfaces that can be configured and positioned to efficiently absorb and dissipate sound waves of a specific frequency. Significantly, the use of metasurfaces as described herein do not increase the heat levels of computing devices substantially compared to existing technologies for sound absorption that do not facilitate ventilation/do not dissipate the heat very well. The specific frequency can be of any frequency/narrowband frequency range over a broad range of audible frequencies, or even subsonic (below 20 Hz)/supersonic frequencies (up to about 20,000 Hz).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

FIG. 1A shows a generalized block diagram of an example system 100 including a sound source 102 such as server fan/fans of a rack of servers that generate undesirable noise including at a frequency that is to be absorbed based on the technology described herein. A frequency measurement tool can be used as a peak frequency detector 104 or the like to determine which approximate narrowband frequency to cancel as described herein. As will be seen, the frequency itself is absorbed extremely efficiently by the technology described herein, with a narrow band of nearby frequencies also reduced to a lesser, but still desirable, extent.

Once the general frequency to cancel is determined, frequency-to resonator parameter logic 106 can be used to determine the parameters 108 of unit cells that can inverse phase cancel that frequency. The parts of the unit cell can be constructed with 3D printer/additive manufacturing technology 110. As a more particular example, consider a group of Helmholtz resonator cavities (e.g., the chamber portions) with respective moveable floors that can be collectively raised or lowered, e.g., each basically like a piston. A shared tuning element 111 such as a piezoelectric actuator (e.g., motor) can be controlled to collectively adjust the heights of the unit cells' chambers, thereby establishing the resonant frequency of the Helmholtz resonator.

The unit cells are based on the principles of Helmholtz resonators, which are acoustic cavities with a small neck port or opening that are highly effective at absorbing specific frequencies via resonance. For example, the resonant frequency ($f_{resonance}$) of a classical Helmholtz resonator with respect to frequencies in the audible range is determined by:

$$f_{resonance} = \frac{c}{2\pi}\sqrt{\frac{S}{L_p V}}$$

where c is the speed of sound, S is the neck port cross-sectional area, $L_p = L_{neck} + 1.7r_{neck}$ (for a cylindrical neck port) and V is the unit cell's cavity chamber's volume.

Figure 1B:
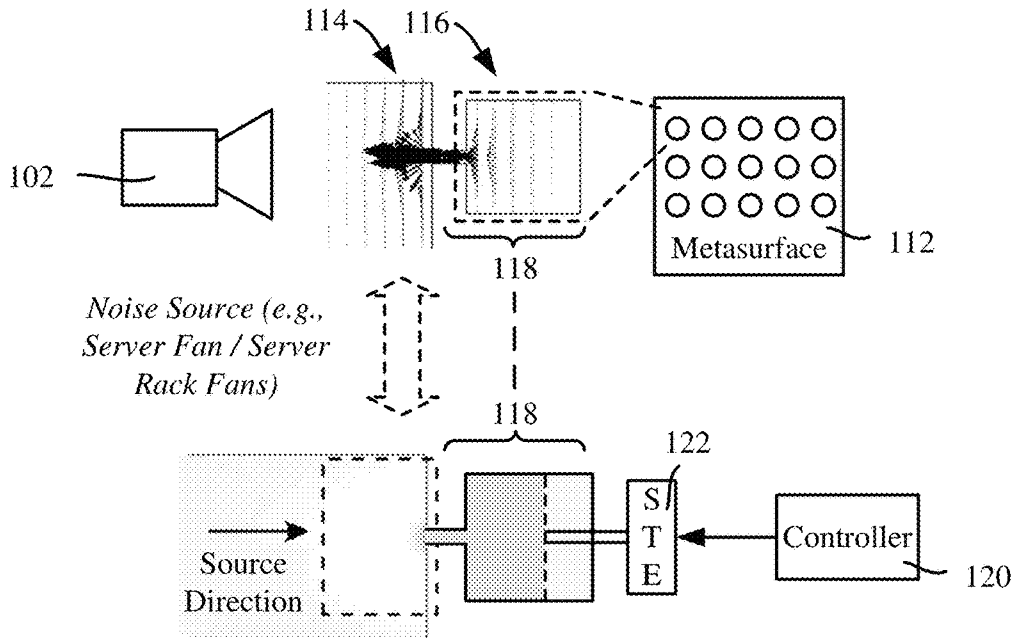
FIG. 1B is a representation of an example metasurface deployed for noise cancellation, including a resonator with a shared tuning element for controllably varying the resonance frequency, in accordance with various example embodiments and implementations of the subject disclosure.

The unit cells, each represented as a small circle in FIGS. 1A and 1B, are incorporated into a (e.g., directly 3D-printed) metasurface 112, which can then be positioned to cancel the noise source at the determined frequency. The shared tuning element 111, described herein, can be positioned at a location that can move a floor in the unit cell. In one implementation, the metasurface 112 contains an array of the unit cell resonator units arranged in a two-dimensional pattern. For absorbing a server's fan noise, for example, the metasurface 112 can be positioned proximate to the server's location, or even wrapped around at least part of the server's housing. The same metasurface noise-cancellation concept can be extended to a rack of servers via appropriately-sized (e.g., larger) and/or more metasurfaces.

As generally represented in FIG. 1B, when incident sound waves (block 114) interact with the metasurface 112, the variable Helmholtz resonators within the array selectively absorb the corresponding frequencies via inverse phase cancellation (represented by vectors in blocks 114 and 116). As sound waves enter the resonators (e.g., the resonator 118) through the neck port, they create pressure fluctuations within the cavities. By engineering the geometrical parameters of the cavity/air chamber, and then adjusting the cavity dimensions as needed, (e.g., via a controller 120 that controls the shared tuning element (STE) 122, e.g., an actuator/piezoelectric motor) as described herein, the resulting resonance frequency of the unit cell creates a n phase shift reflected wave with respect to the incident wave. This is generally shown in FIG. 1B, where the two sets of waves with opposite phases cancel, effectively absorbing the frequency. This is highlighted via the air velocity vector plot showing the direction of the reflected wave with π phase shift in the upper portion of FIG. 1B. In addition, these pressure fluctuations also cause the air inside the cavities to oscillate, effectively converting acoustic energy into kinetic energy. This kinetic energy is then dissipated as heat through viscous losses in the narrow neck of the resonators, however the heat dissipation is appreciably better relative to traditional sound absorbers and does not significantly affect thermal performance of a server.

Figure 2A:
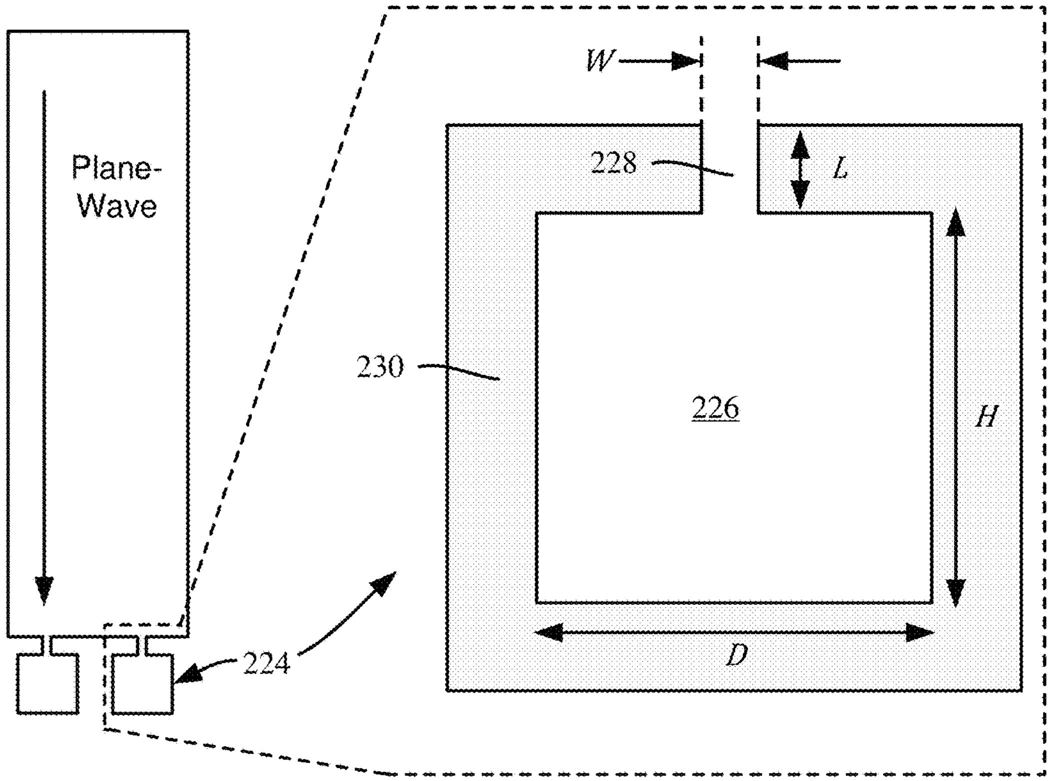
FIG. 2A is a two-dimensional side view representation of example unit cells including one enlarged unit cell showing various dimensions that determine, in part, the unit cell's resonance frequency, in accordance with various example embodiments and implementations of the subject disclosure.

As generally represented in FIG. 2A, each unit cell 224 comprises a cavity, or air chamber 226, often with a neck port 228 that exposes the air chamber to the air/incoming sound waves, with dimensions engineered to target a particular frequency or a narrowband range of frequencies of interest. The dimensions of the air chamber 226 and neck port 228 are designed based on generally desired narrow band of acoustic frequencies to cancel, allowing the unit cells of the metasurface 112 (FIG. 1) to resonate when exposed to sound waves of those frequencies. When constructed, the air chamber 226 and neck port 228, which are hollow to contain air, and have one or more variable dimensions as described herein, are enclosed in a supporting structure 230 through which the neck port 228 extends to couple the chamber to the air propagating the sound wave.

FIG. 2A illustrates the unit cell's dimensions, which are "variable" during initial design before fabrication, and then once constructed and deployed, are controllably variable/tunable via actuator adjustment (not explicitly shown in FIG. 2A) as described herein. The dimensions include the chamber height (H), and in the example of a cylindrical air chamber, the chamber's diameter (D) which is twice the radius, such that a cylindrical air chamber's volume is:

$$V=\left(\pi\times\frac{1}{2}D\right)^2\times H.$$

The neck port, which is also a cylindrical tube in this example, has an area of $$\left(\pi\times\frac{1}{2}W\right)^2$$

and a length of L. The unit cell is not limited to cylindrical air chambers or cylindrical necks, but can be of any suitable shape that facilitates resonating at the desired frequency in a manner that phase cancels the incoming sound wave of that frequency.

Figure 2B:
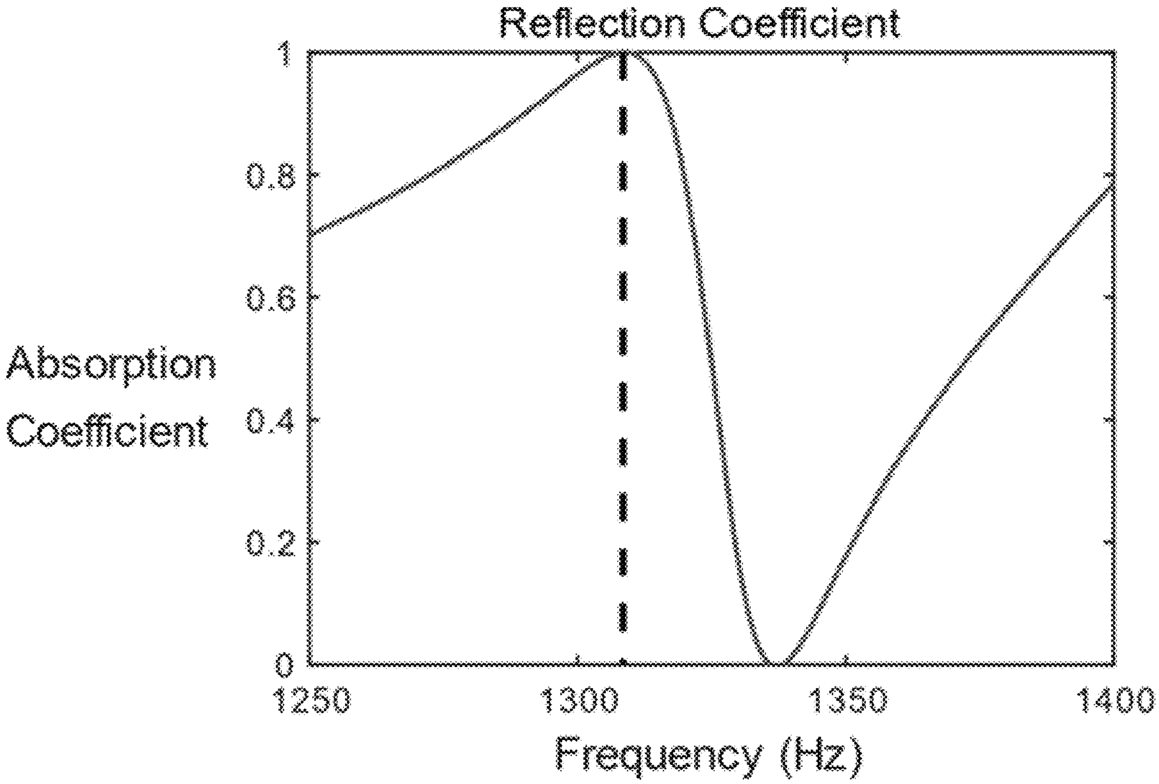
FIG. 2B is a graphical representation of resulting absorption coefficient values of the unit-cell(s) of FIG. 2A over a range of frequencies, including a very high absorption coefficient value at the designed frequency 1310 Hz, in accordance with various example embodiments and implementations of the subject disclosure.

The result is highly efficient sound absorption at specific frequencies as shown in FIG. 2B, which in this example is around 1310 Hz, making this metasurface particularly useful for targeted noise reduction in environments where controlling specific frequencies is beneficial, such as in architectural acoustics, automotive design, and industrial settings. The dimensions are deep subwavelength values relative to the subwavelength of the incoming wave. For example, one metasurface implementation was designed to inverse phase cancel an incoming frequency 1310 Hz, with selected unit-cell dimensions of D=18 mm, H=16 mm, L=6 mm, W=3.2 mm. The resulting absorption coefficient of the designed unit-cell achieved near-perfect (greater than 98 percent absorption at the designed frequency 1310 Hz), as shown in FIG. 2B. As can be seen from this example, the structure is deeply sub-wavelength; the wavelength λ at 1310 Hz in air is 260 mm, which is controlled by unit-cell with thickness of 22 mm. As can be seen, the above-selected dimensions of D, H, L and W for 1310 hertz (λ=260 m) in air range from about λ/14 to λ/81 (or λ/13 if based on the thickness of 22 mm).

Note that while the curve of FIG. 2B shows about seventy percent absorption effectiveness around 1250 Hz increasing to the peak absorption at the desired frequency 1310 Hz, the curve can be flattened more around the designed frequency to an extent, e.g., by slightly tweaking the dimensions of some of the unit cells.

A designed unit cell only needs air and its surrounding acoustic hard boundaries. This is different from other approaches using porous and fibrous materials and gradient index materials. At this scale, the unit-cell acts almost like a point towards the wave, so this design is not straightforward. However, the materials and the compact design in mm-scale/deeply sub-wavelength facilitate fabricating the unit cell as a thin, light-weight, and cost effective absorber with 3D printing technology.

Figure 3:
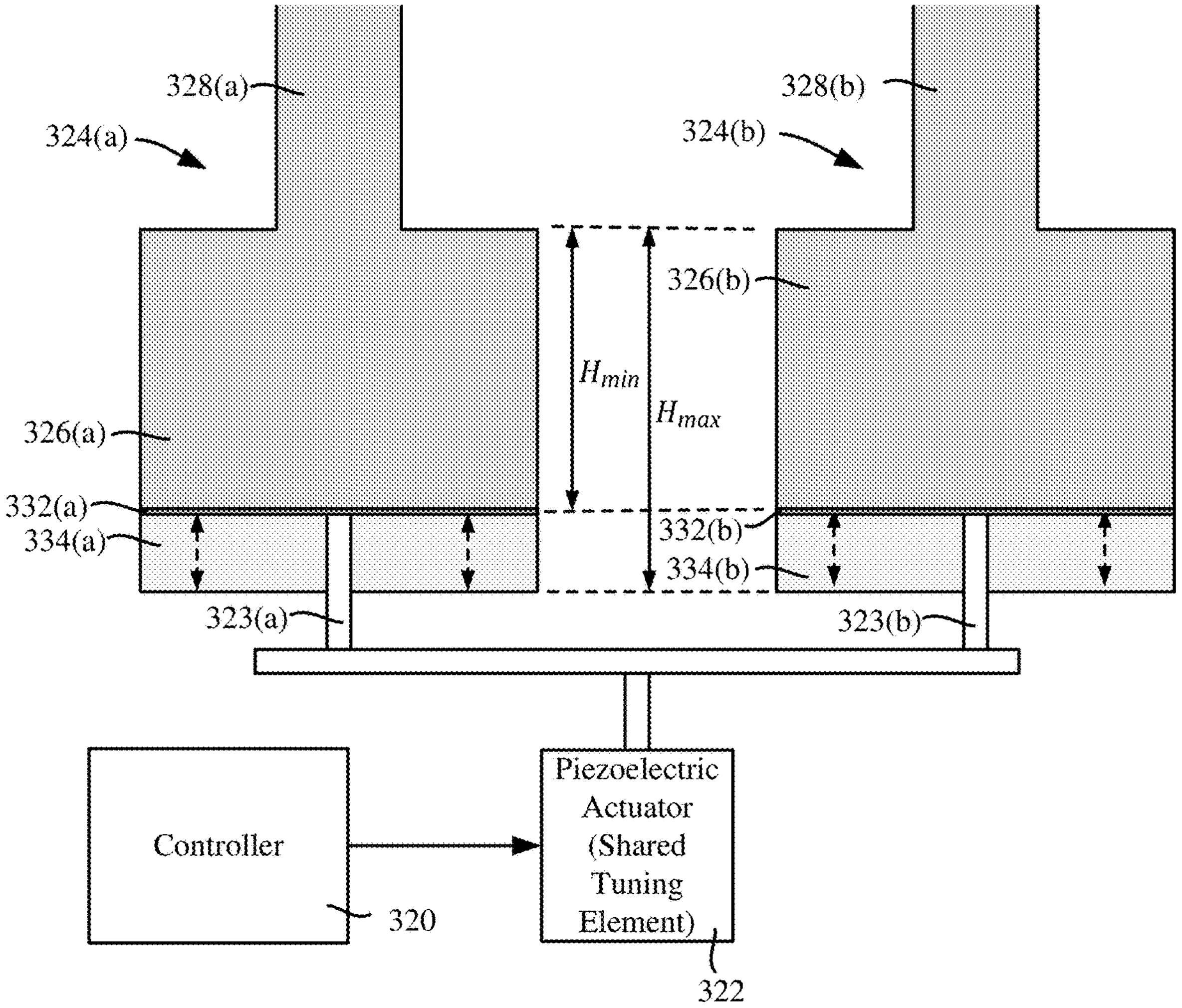
FIG. 3 is a side view representation of example noise canceling Helmholtz resonators in which a shared piezoelectric actuator as a tuning element for collectively varying the resonance frequency of the unit cell resonators by adjusting movable floors in the resonators' chambers, in accordance with various example embodiments and implementations of the subject disclosure.

FIG. 3 shows the concept of two (of possibly a larger group of) Helmholtz resonators 324(*a*) and 324(*b*) with variable resonance, which in this example is based on a tuning element in the form of a piezoelectric actuator (PA) 322, controlled by a controller 320; (a similar motor that is not a piezoelectric actuator alternatively can be used). As shown in FIG. 3, the example piezoelectric actuator (PA) 322 is physically coupled via a mechanically linkage (e.g., via piston-like rods 323(*a*) and 323(*b*) or the like with a linking crossbar or the like to move a moveable partition (in this example, moveable floors/pistons 332(*a*) and 332(*b*) of the resonators 324(*a*) and 324(*b*), respectively), and thus is able to change the chambers' effective heights between some minimum height $H_{min}$ and a maximum height $H_{max}$, and thereby vary the chambers' volumes the (darker-shaded) chamber portions labeled 326(*a*) and 326(*b*). In general, the controller 320 selectively actuates the piezoelectric actuator 322 to change the amount of piston rods' displacement and thus the amount of chamber floors' displacement and corresponding resonance frequency; the range of chamber floors' displacement is shown by the dashed vertical arrows in the chamber portions labeled portions labeled 326(*a*) and 326(*b*).

In the example of FIG. 3, the chambers' variable volumes with respect to resonating is the portion labeled 326(*a*) and 326(*b*), which can be varied by control of the amount of piezoelectric actuator 322. The volume of air in the (lightly-shaded) chamber portions labeled 334(*a*) and 334(*b*) (e.g., entering and exiting via one or more vents so that the air pressure is close to equalized) thus varies as well, but does not significantly affect the resonance of the Helmholtz resonators 324(*a*) and 324(*b*). Gaskets or seals can be used if needed; however, any slight change in the air pressure in the chamber portions 334(*a*) and 334(*b*) resulting from leaks around the moveable floors 332(*a*) and 32(*b*) likely can be compensated for by slightly adjusting the floors' heights.

Figure 4:
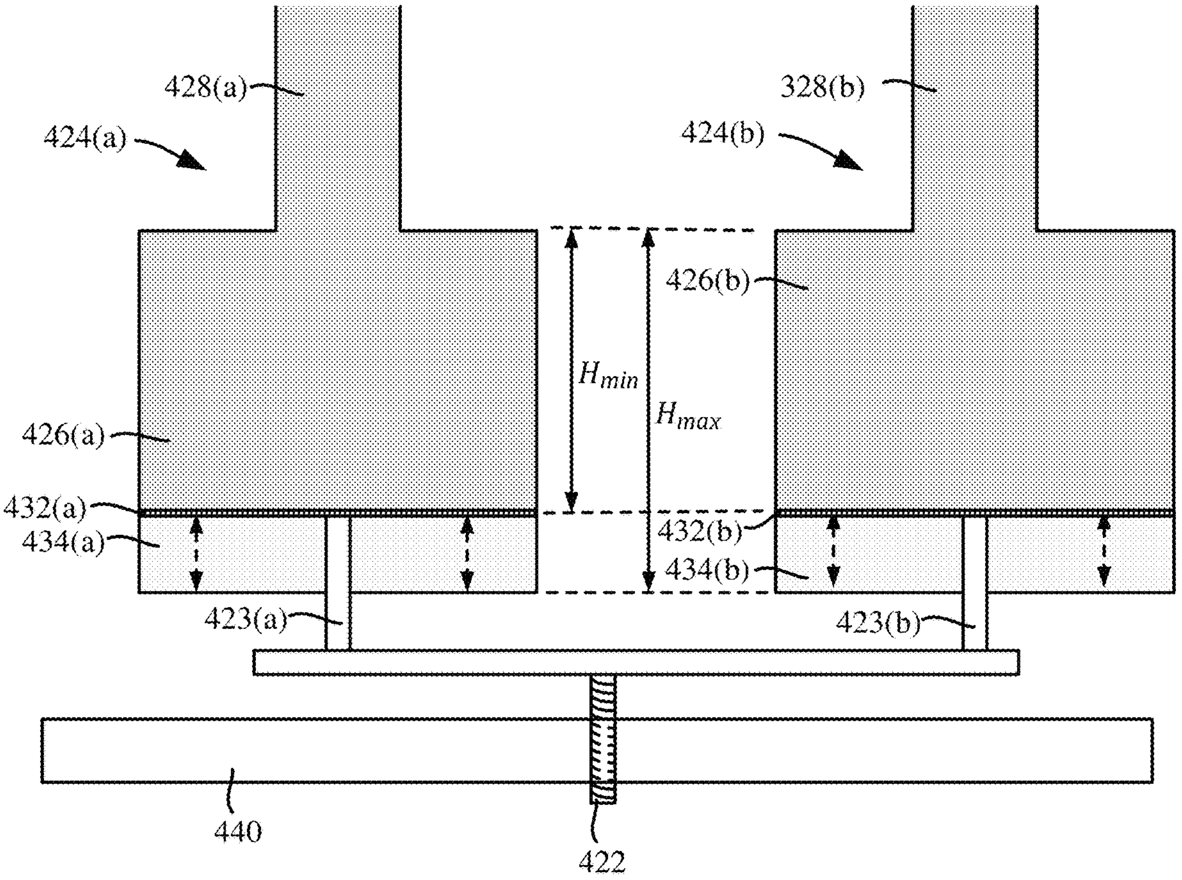
FIG. 4 is a side view representation of example noise canceling Helmholtz resonators in which a shared screw acts as an actuator for collectively varying the resonance frequency of the unit cell resonators by moving moveable floors in the resonators' chambers, in accordance with various example embodiments and implementations of the subject disclosure.

FIG. 4 shows a similar concept of a group of Helmholtz resonators 424(*a*) and 424(*b*) with variable resonance, which in this example is based on a tuning element in the form of a screw 422 that is turned to change its height relative to a fixed portion 440, e.g., part of or coupled to the structure surrounding the hollow air resonators. Note that the elements/components in FIG. 4 are labeled 4*xx* instead of their counterparts labeled 3*xx* in FIG. 3, and thus are not described again for purposes of brevity. As can be seen, adjustment of the chamber volumes via the screw 422 is thus facilitated, although manual relative to a controller/motor driven displacement as in FIG. 3, and thus not particularly dynamic. The screw can be threaded (or coupled to gear(s) not shown) so that a certain amount of rotation corresponds to a certain amount of frequency change.

Figure 5A:
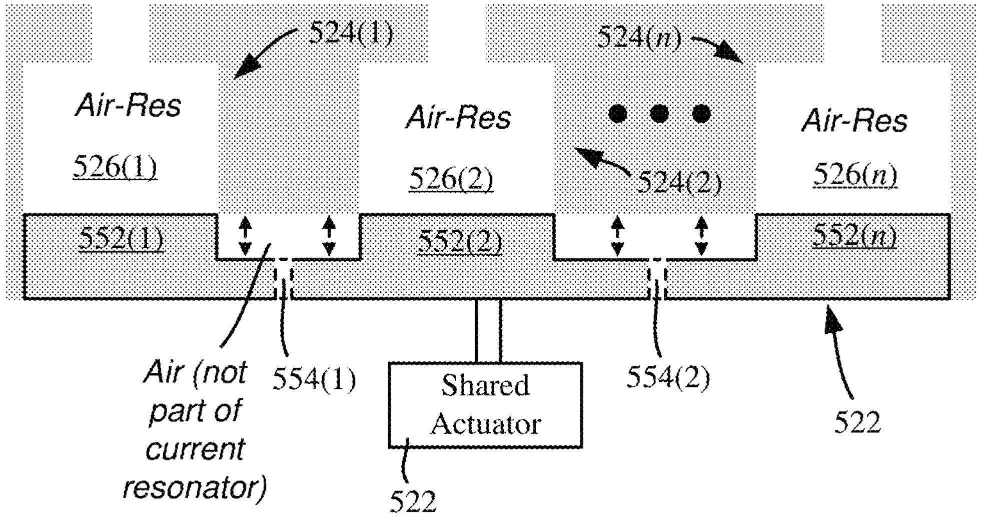
FIGS. 5A and 5B are side view representation of example noise canceling Helmholtz in which a shared actuator collectively varies the resonance frequency of the unit cell resonators by moving (from a first position in FIG. 5A to a second position in FIG. 5B) a shared moveable sheet with respective protrusions that act as respective moveable floors of their respective resonators' chambers, in accordance with various example embodiments and implementations of the subject disclosure.
Figure 5B:
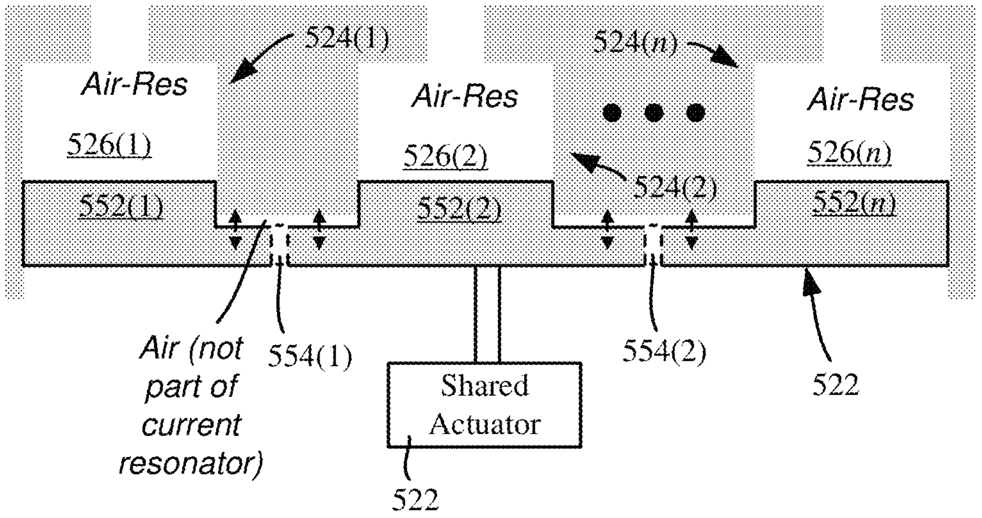

FIGS. 5A and 5B show a similar concept of changing the cavity volumes, which in FIGS. 5A and 5B is via a shared moveable sheet 550 with protrusions 552(1)-552(*n*) (e.g., cylindrical) that form the respective movable floors of the resonators 542(*a*)-542(*n*). Vents 554(1)-554(2) (two are shown, but others may be present) for air pressure equalization facilitate movement of the moveable sheet 550 by the shared actuator (tuning element) 522. As can be seen in FIG. 5B (versus FIG. 5A), the volumes of the chambers 526(*a*)-526(*n*) are reduced by moving the moveable sheet 522 upwards, thereby changing the resonance frequency of the resonators 542(*a*)-542(*n*).

By way of an example usage scenario, consider a metasurface of such unit cells configured to noise cancel the fan noise emanating from a server. The Helmholtz resonators' resonant frequency can be adjusted as described herein to significantly cancel the noise. Later, consider that the server fan changes its frequency as the server heats up/cools down, or that the server is replaced with a different server having a different fan noise frequency. Adjusting the shared tuning element operates to cancel the different frequency instead.

Figure 6:
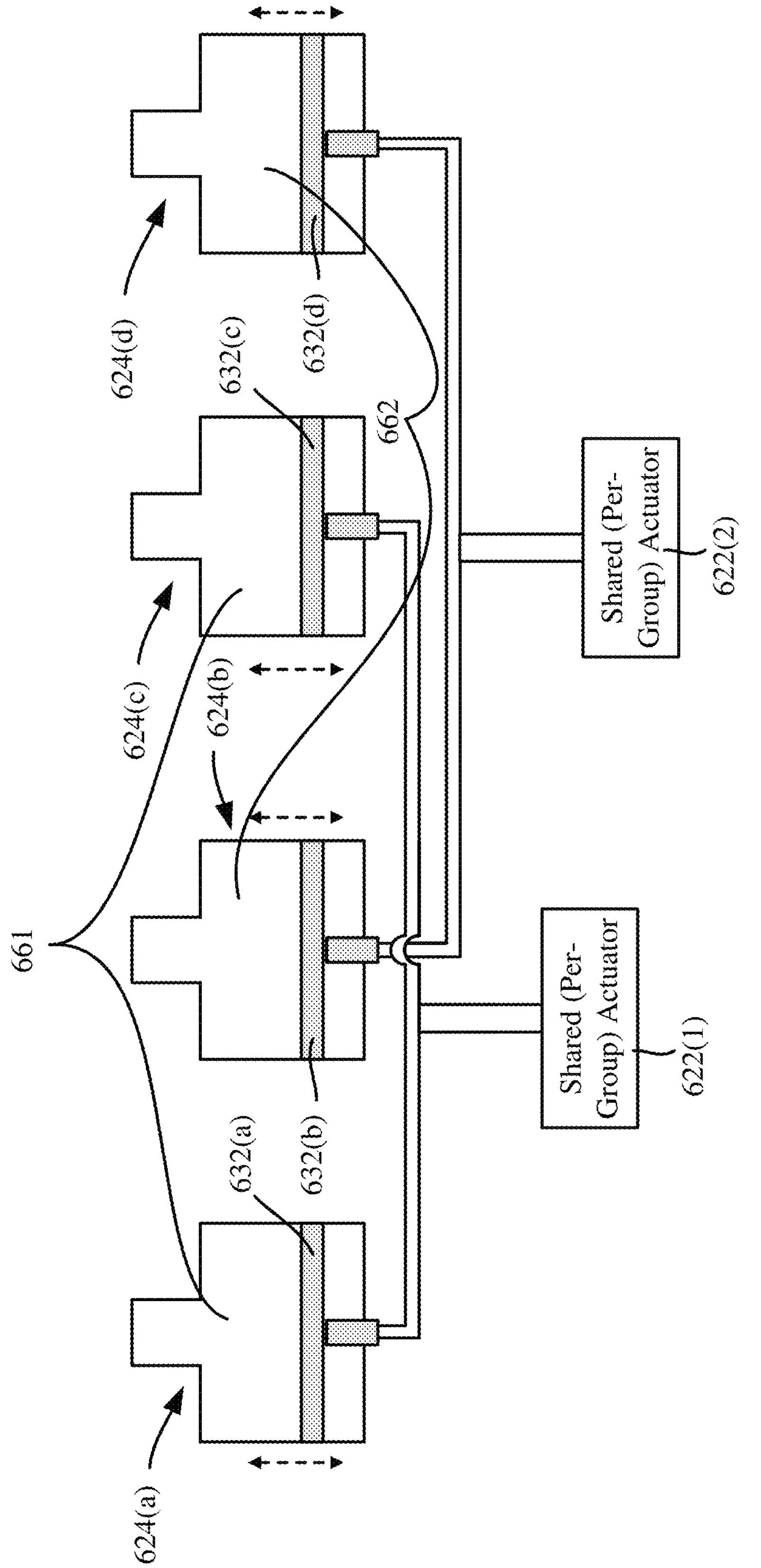
FIG. 6 is a side view representation of example noise canceling Helmholtz resonators that are arranged as separate groups of unit cells with independently moveable floors for independently varying each group's resonance frequency, in accordance with various example embodiments and implementations of the subject disclosure.

FIG. 6 shows another concept (similar to FIG. 3) with separate groups 661 and 662 of resonators 624(*a*)-624(*d*) having independently movable moveable floors/pistons per group. The groups 661 and 662 can be interleaved in a pattern, e.g., every other unit cell resonator can be in a first group, with every other in-between unit cell resonator in a second group. Thus, for example, in FIG. 6 the group 661 includes the resonators 624(*a*) and 624(*c*), and the group 662 includes the resonators 624(*b*) and 624(*d*). Independent control of the groups allows for noise cancellation of different frequency peaks, such as if two peaks are fairly dominant. There can be more than two independently adjustable resonator groups to cancel more than two frequencies.

The unit cell resonators 624(*a*) and 624(*c*) of the group 661 have moveable floors/pistons 632(*a*) and 632(*c*), respectively, controlled by per-group shared actuator 622(1). The unit cell resonators 624(*b*) and 624(*d*) of the group 662 have moveable floors/pistons 632(*b*) and 632(*d*), respectively, controlled by per-group shared actuator 622(2). Each actuator can be a separate motor (similar to FIG. 3), or a separate screw (similar to FIG. 4). It is also feasible to have a single actuator/tuning element with a mechanical device that shifts between each group as resonant frequency adjustment to that group is needed; if a motor, such a single motor and mechanical device can be controlled by a controller for more dynamic adjustment.

Figure 7:
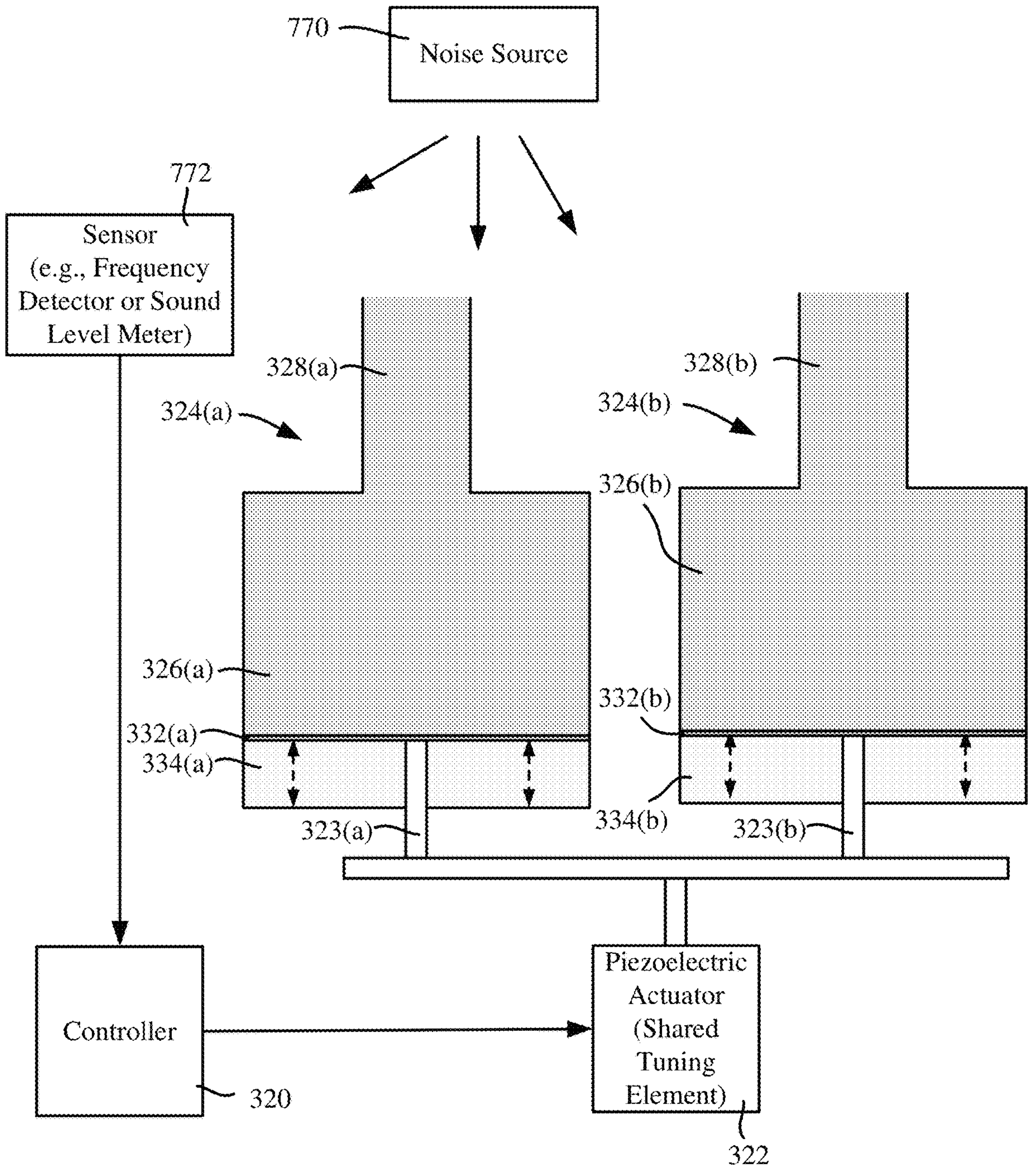
FIG. 7 is a side view representation of example noise canceling Helmholtz resonator unit cells in which a shared piezoelectric actuator varies the unit cell's resonance frequency by moving floors/pistons in the resonators' chambers based on sensor feedback to a controller, in accordance with various example embodiments and implementations of the subject disclosure.

FIG. 7 shows the concept of feedback-based adjustment for noise cancellation, using the variable dimensions (chamber height/volume) resonators 324(*a*) and 324(*b*) of FIG. 3. In general, a noise source 770 such as one or more server fans outputs noise that can be sensed by a sensor 772. For example, a frequency sensor can pick up the main frequency peak of the noise, and communicate this information to the controller 320. The controller can then calculate (or look up/interpolate from previously determined data) the chamber height/volume needed to cancel that frequency, and adjust the piezoelectric actuator 322 accordingly. Another alternative is to sense the noise level, e.g., at some appropriate location or locations, and adjust the piezoelectric actuator 322 until the lowest amount of noise level results. As the frequency of the acoustic wave (noise) changes, the shared tuning element (piezoelectric actuator 322) can be adjusted to cancel the changed frequency, which can be a reasonably rapid adjustment.

Figure 8:
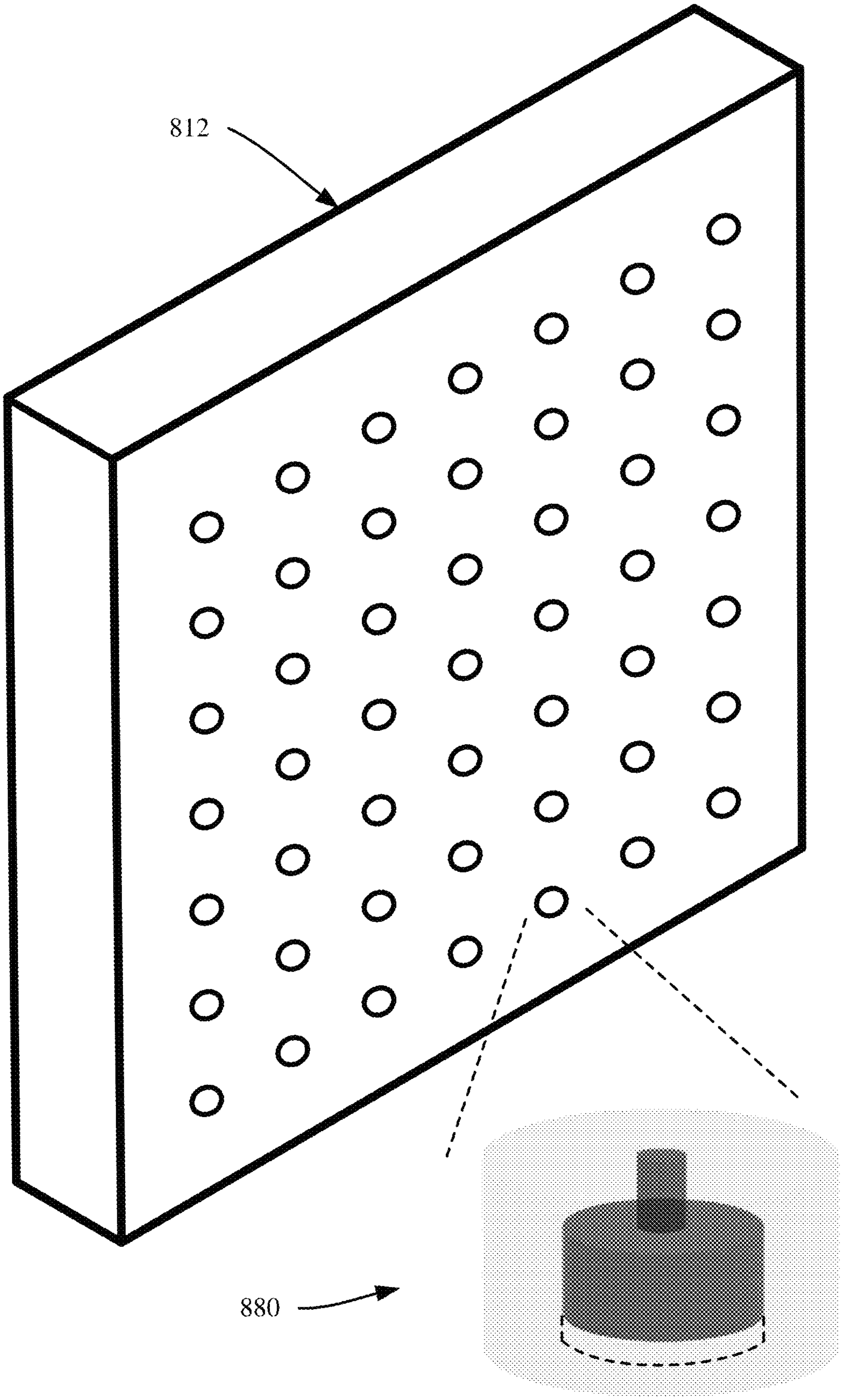
FIG. 8 is a three-dimensional representation of an example sound absorbing metasurface showing an enlarged view of an example unit cell with variable cavity dimensions, in accordance with various example embodiments and implementations of the subject disclosure.

Some or all of the sound absorbing unit cells can be fabricated using 3D printing technology with the features of material simplicity and deeply sub-wavelength compact design. An illustration of an example metasurface 812 with an arrayed distribution of variable volume unit-cells (one of which labeled 880 is enlarged) is shown in FIG. 8.

Figure 9:
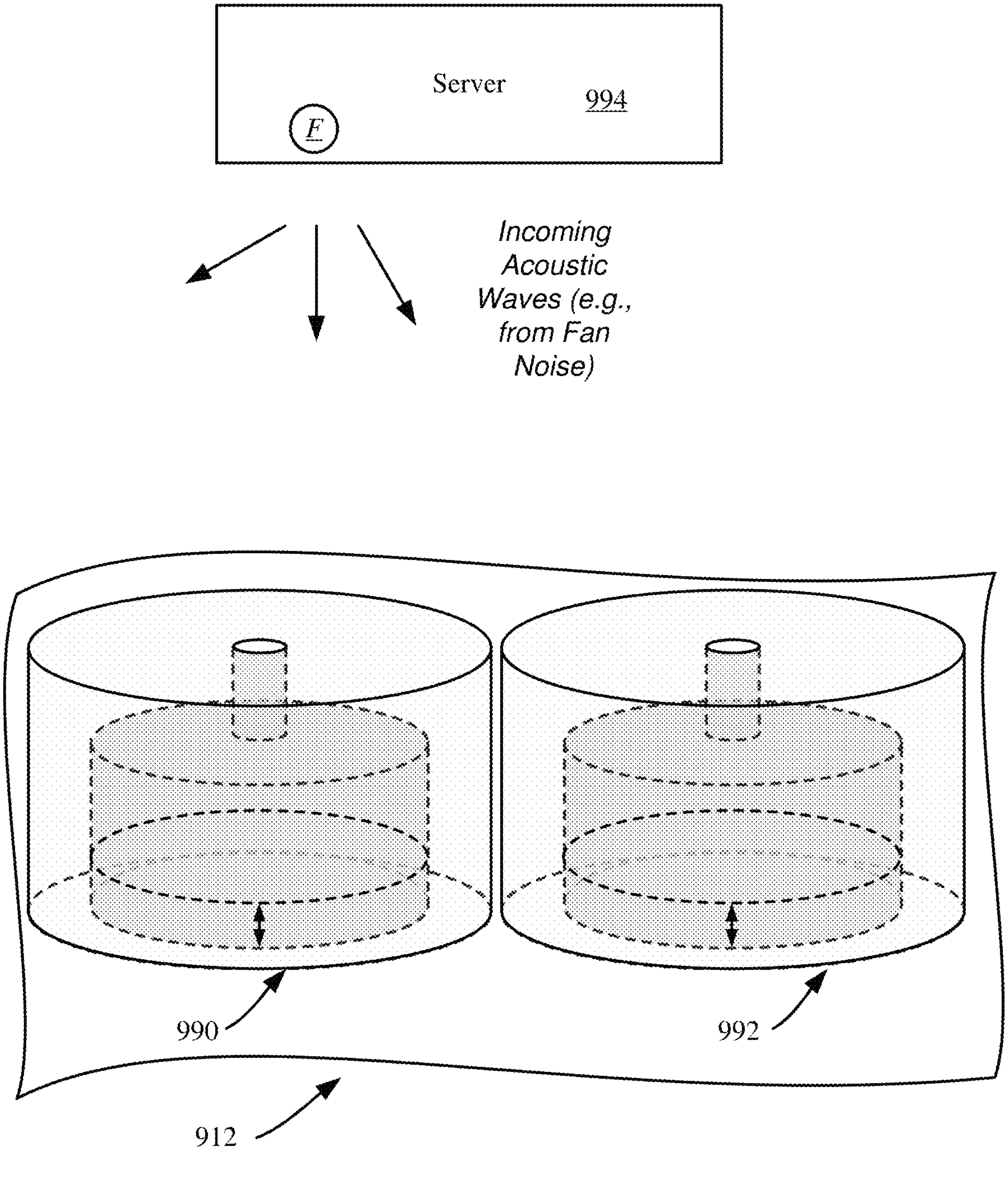
FIG. 9 is a representation of an example portion of a sound absorbing metasurface showing an enlarged view of two of a metasurface's adjacent, variable cavity unit cells positioned to phase cancel a narrowband frequency within incoming acoustic waves from a server, in accordance with various example embodiments and implementations of the subject disclosure.
Figure 10:
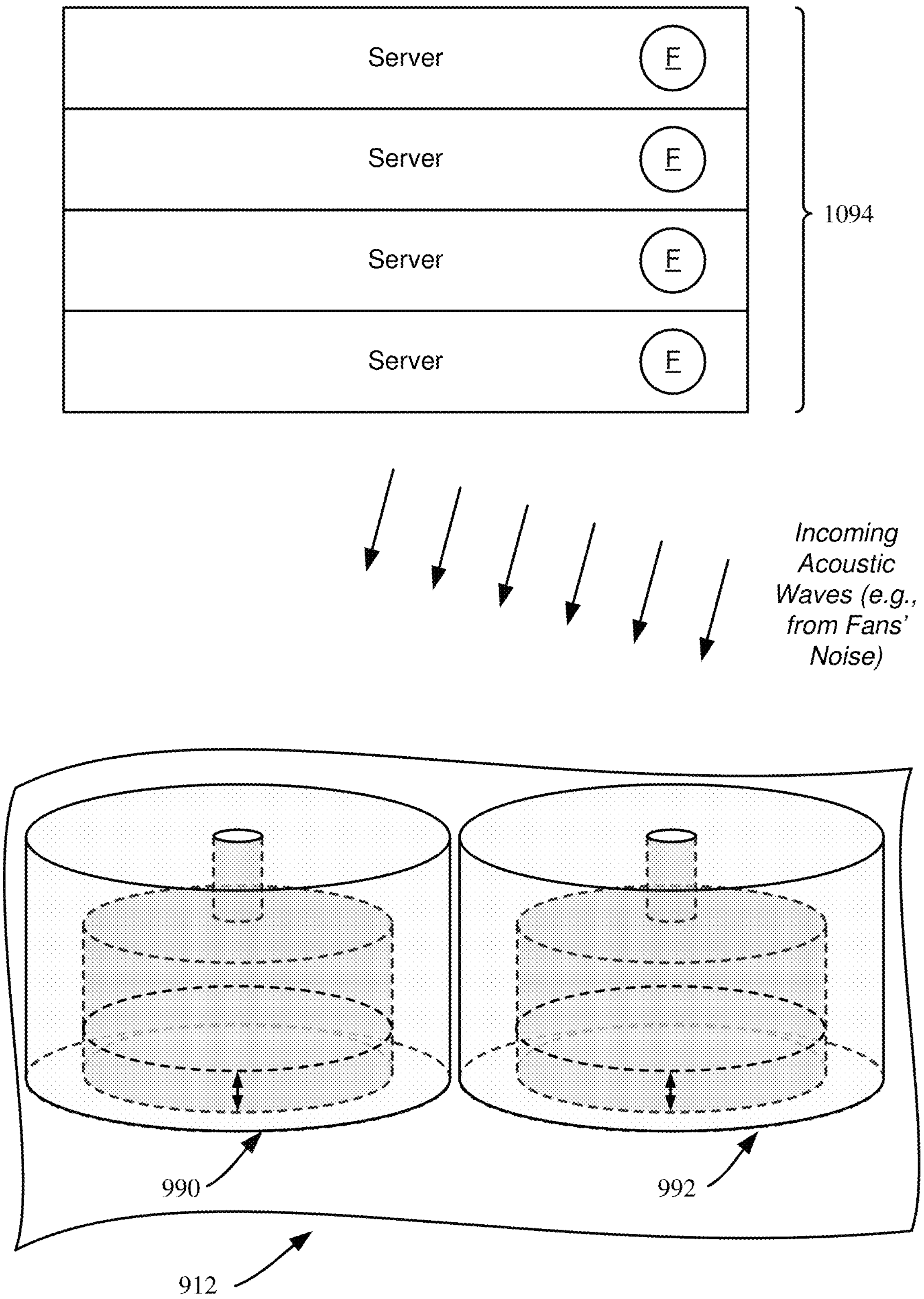
FIG. 10 is a representation of an example portion of a sound absorbing metasurface showing an enlarged view of two of a metasurface's adjacent, variable cavity unit cells positioned to phase cancel a narrowband frequency within incoming acoustic waves from a rack of servers, in accordance with various example embodiments and implementations of the subject disclosure.
Figure 11:
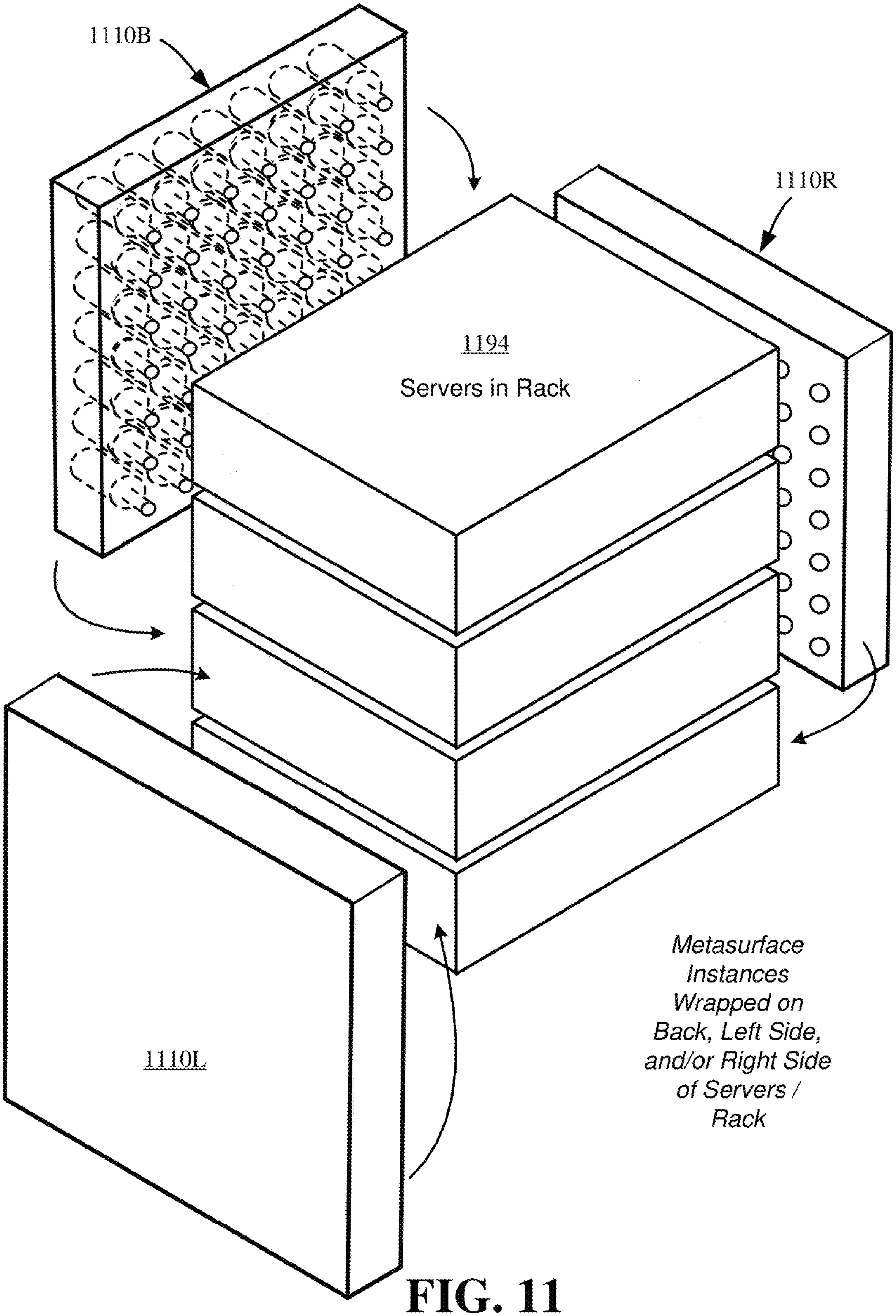
FIG. 11 is a three-dimensional, perspective representation of an example sound absorbing metasurface composed of unit cells for wrapping around a rack of servers to reduce noise emanating from the servers, in accordance with various example embodiments and implementations of the subject disclosure.

FIG. 9 depicts an example usage scenario, in which a portion of a metasurface 912 is shown with two enlarged moveable-floor type unit cells 990 and 9922 positioned proximate a server 994 to cancel noise emanating from the server's fan F. Although not explicitly shown herein, a metasurface or multiple metasurfaces as described herein can be positioned as a noise canceling device proximate a server (FIG. 9) or rack of servers 1094 (FIG. 10), and/or wrapped around at least part of a server or rack of servers 11 (metasurfaces 1110B, 1110L and 1110R) as depicted in FIG. 11.

One or more aspects can be embodied in a system, such as described and represented in the drawing figures herein. The system can include an acoustic metasurface including a resonator group including Helmholtz resonators. The Helmholtz resonators of the resonator group can include cavities with adjustable cavity volumes. The system further can include an actuator configured to collectively change the adjustable cavity volumes of the resonator group to determine a resonant frequency of the Helmholtz resonators of the resonator group to phase cancel an acoustic wave.

The actuator can include a motor that collectively changes the adjustable cavity volumes of the resonator group in response to the motor being energized. The motor can include a piezoelectric motor.

The actuator can include a screw that collectively changes the adjustable cavity volumes of the resonator group in response to the screw being turned.

The cavities with adjustable cavity volumes can share a moveable sheet that acts as a moveable floor of the cavities.

The cavities with adjustable cavity volumes can be respective cavities with respective moveable floors, and the actuator can be coupled to the respective moveable floors. The resonator group can be a first resonator group that can include first cavities with first respective moveable floors, and the system further can include a second resonator group that can include second cavities with second adjustable respective moveable floors, in which the actuator is further configured to collectively change the second adjustable cavity volumes of the second resonator group by moving the second respective moveable floors independent of moving the first respective moveable floors.

The actuator can include a motor, and further comprising a controller that selectively energizes the motor to collectively change the adjustable cavity volumes of the resonator group. The controller can be coupled to a sensor that outputs data related to the incoming acoustic wave, and wherein the controller selectively energizes the motor based on the data.

The sensor can include a frequency sensor that outputs data related to a frequency of the acoustic wave.

The sensor can include a sound level sensor that outputs data related to noise corresponding to the acoustic wave.

One or more aspects can be embodied in an acoustic metasurface, such as described and represented in the drawing figures herein. The acoustic metasurface can include respective Helmholtz resonators including respective neck ports and respective chambers having respective dimensions that determine a resonant frequency of the Helmholtz resonators. The respective chambers can include respective moveable floors that are collectively moved by a tuning element to change the respective dimensions of the respective Helmholtz resonators.

The respective Helmholtz resonators can include respective air cavities distributed in an array within a solid portion of the acoustic metasurface.

The respective Helmholtz resonators can be first respective Helmholtz resonators of a first unit cell group, and the acoustic metasurface further can include second respective Helmholtz resonators of a second unit cell group that second respective neck ports and second respective chambers; the second respective chambers can include second respective moveable floors that are collectively moved by the tuning element, independent of the first respective moveable floors.

The first unit cell group can be interleaved with the second unit cell group.

The respective Helmholtz resonators can be first respective Helmholtz resonators of a first unit cell group, the respective dimensions can be first respective dimensions, the tuning element can be a first tuning element. The acoustic metasurface further can include second respective Helmholtz resonators of a second unit cell group including second respective neck ports and second respective chambers; the second respective chambers can include second respective moveable floors that are collectively moved by a second tuning element to change second respective dimensions of the second respective Helmholtz resonators.

Figure 12:
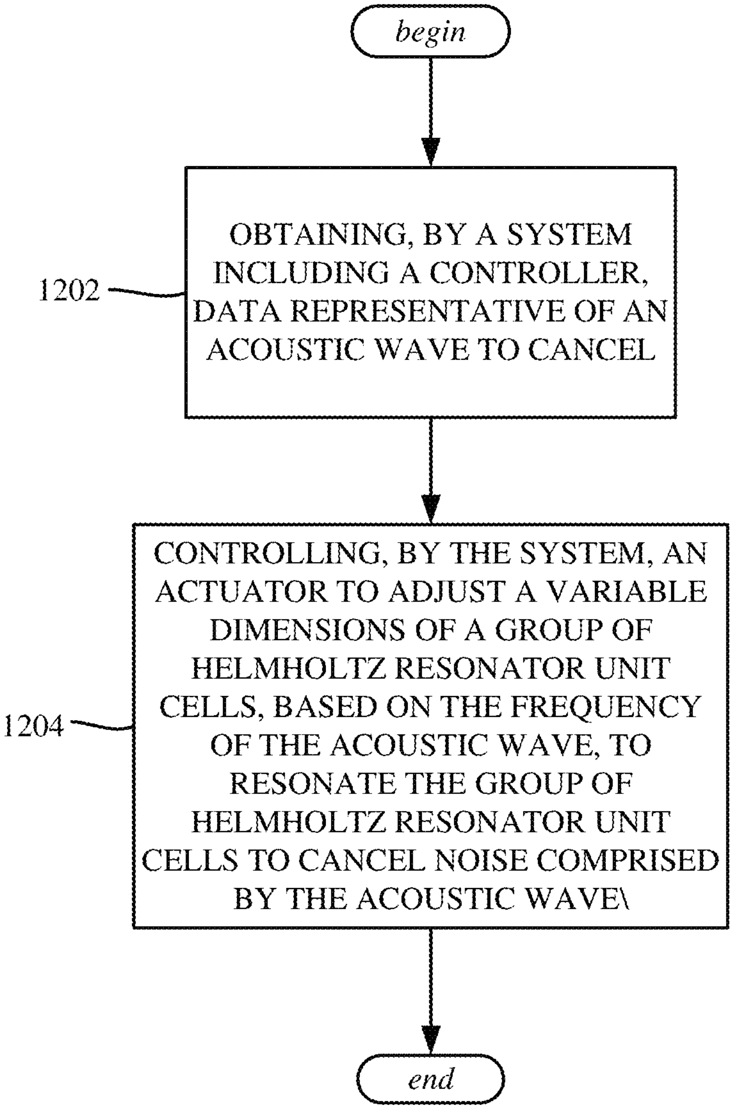
FIG. 12 is a flow diagram showing example operations related to controlling an actuator to adjust variable dimensions of a group of Helmholtz resonator unit cells, to resonate the Helmholtz resonator unit cells to cancel acoustic wave noise, in accordance with various example embodiments and implementations of the subject disclosure.

One or more example aspects, such as corresponding to example operations of a method, are represented in FIG. 12. Example operation 1202 represents obtaining, by a system including a controller, data representative of an acoustic wave to cancel. Example operation 1202 represents controlling, by the system, an actuator to adjust a variable dimensions of a group of Helmholtz resonator unit cells, based on the frequency of the acoustic wave, to resonate the group of Helmholtz resonator unit cells to cancel noise comprised by the acoustic wave.

Obtaining the data representative of the acoustic wave to cancel can include receiving, by the controller from a frequency sensor coupled to the controller, frequency-related data representative of the acoustic wave.

Obtaining the data representative of the acoustic wave to cancel can include receiving, by the controller from a sound level sensor coupled to the controller, sound level-related data representative of a noise level of the noise comprised by the acoustic wave.

The data representative of the acoustic wave to cancel can include first data representative of a first acoustic wave to cancel, the frequency of the acoustic wave can be a first frequency, the noise comprised by the acoustic wave can include first noise, and further operations can include obtaining, by the system, second data representative of a second acoustic wave to cancel, and controlling, by the system, the actuator to adjust the variable dimensions of the group of Helmholtz resonator unit cells, based on a second frequency of the second acoustic wave, to resonate the group of Helmholtz resonator unit cells to cancel second noise comprised by the second acoustic wave.

As can be seen, the technology described herein facilitates construction and deployment of a metasurface of unit cells having variable dimensions controlled via a shared tuning element, such as a piezoelectric actuator or screw, which can be implemented in a practical, compact and lightweight surface configuration. As one example, the metasurface is highly useful in the context of mitigating server noise. One unit-cell design achieved high sound absorption of an incoming sound wave at the frequency for which it was designed and piezoelectric actuator-adjusted. Based on the technology described herein, thin, light-weight, and cost effective sound absorbers can be constructed, including by using 3D printing and piezoelectric technology.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

an acoustic metasurface comprising first Helmholtz resonators comprising first neck ports and first chambers having first dimensions that determine a resonant frequency of the first Helmholtz resonators, wherein the first chambers comprise first moveable floors;

second Helmholtz resonators comprising second neck ports and second chambers having second dimensions that determine a resonant frequency of the second Helmholtz resonators, wherein the second chambers comprise second moveable floors, wherein the first chambers and the second chambers comprise a shared moveable sheet comprising respective protrusions that form the first moveable floors and the second moveable floors, and wherein the shared moveable sheet is moveable between a first position and a second position to change the first dimensions and the second dimensions; and a first tuning element configured to collectively move the first moveable floors to change the first dimensions and a second tuning element configured to collectively move the second moveable floors to change the second dimensions to phase cancel an acoustic wave.

2. The system of claim 1, wherein the first tuning element comprises a motor that collectively changes the first dimensions and the second dimensions in response to the motor being energized.

3. The system of claim 2, wherein the motor comprises a piezoelectric motor.

4. The system of claim 1, wherein the first tuning element comprises a screw that collectively changes the first dimensions and the second dimensions in response to the screw being turned.

5. The system of claim 1, wherein the first chambers and the second chambers share a moveable sheet that acts as a moveable floor of the first chambers and the second chambers.

6. The system of claim 1, wherein the first chambers and the second chambers respective chambers with respective moveable floors, and wherein the first tuning element and the second tuning element are coupled to the respective moveable floors.

7. The system of claim 6, wherein the second tuning element is further configured to collectively change the second dimensions of the second resonator group by moving the second respective moveable floors independent of moving the first respective moveable floors.

8. The system of claim 1, wherein the first tuning element comprises a motor, and further comprising a controller that selectively energizes the motor to collectively change the first dimensions and the second dimensions.

9. The system of claim 8, wherein the controller is coupled to a sensor that outputs data related to the acoustic wave, and wherein the controller selectively energizes the motor based on the data.

10. The system of claim 9, wherein the sensor comprises a frequency sensor that outputs data related to a frequency of the acoustic wave.

11. The system of claim 9, wherein the sensor comprises a sound level sensor that outputs data related to noise corresponding to the acoustic wave.

12. An acoustic metasurface, comprising:

respective moveable floors comprising first respective moveable floors and second respective moveable floors;

respective chambers comprising first respective chambers and second respective chambers;

first respective Helmholtz resonators comprising first respective neck ports and the first respective chambers having first respective dimensions that determine a resonant frequency of the first respective Helmholtz resonators, wherein the first respective chambers comprise the first respective moveable floors that are collectively moved by a first tuning element to change the first respective dimensions of the first respective Helmholtz resonators; and second respective Helmholtz resonators comprising second respective neck ports and the second respective chambers having respective dimensions that determine a resonant frequency of the second respective Helmholtz resonators, wherein the second respective chambers comprise the second respective moveable floors that are collectively moved by a second tuning element to change the second respective dimensions of the second respective Helmholtz resonators, wherein the first respective chambers and the second respective chambers comprise a shared moveable sheet comprising respective protrusions that form the respective moveable floors of the respective chambers, and wherein the shared moveable sheet is moveable between a first position and a second position to change the respective dimensions of the respective chambers.

13. The acoustic metasurface of claim 12, wherein the respective Helmholtz resonators comprise respective air cavities distributed in an array within a solid portion of the acoustic metasurface.

14. The acoustic metasurface of claim 12, wherein second respective moveable floors are collectively moved by the second tuning element, independent of the first respective moveable floors.

15. The acoustic metasurface of claim 14, wherein the first unit cell group is interleaved with the second unit cell group.

16. The acoustic metasurface of claim 12, wherein the second respective moveable floors are collectively moved by the second tuning element to change second respective dimensions of the second respective Helmholtz resonators.

17. A method, comprising:

obtaining, by a system comprising a controller, data representative of an acoustic wave to cancel; and controlling, by the system, a first tuning element to collectively move first moveable floors of first chambers of first Helmholtz resonators and a second tuning element to collectively move second moveable floors of second chambers of second Helmholtz resonators, wherein the first chambers and the second chambers comprise a shared moveable sheet comprising respective protrusions that form the first moveable floors and the second moveable floors, and wherein the shared moveable sheet is moveable between a first position and a second position to change first dimensions of the first chambers and second dimensions of the second chambers, based on a frequency of the acoustic wave, to resonate the first Helmholtz resonators and the second Helmholtz resonators to cancel noise comprised by the acoustic wave.

18. The method of claim 17, wherein the obtaining of the data representative of the acoustic wave to cancel comprises receiving, by the controller from a frequency sensor coupled to the controller, frequency-related data representative of the acoustic wave.

19. The method of claim 17, wherein the obtaining of the data representative of the acoustic wave to cancel comprises receiving, by the controller from a sound level sensor coupled to the controller, sound level-related data representative of a noise level of the noise comprised by the acoustic wave.

20. The method of claim 17, wherein the data representative of the acoustic wave to cancel comprises first data representative of a first acoustic wave to cancel, wherein the frequency of the acoustic wave is a first frequency, wherein the noise comprised by the acoustic wave comprises first noise, and further comprising:

obtaining, by the system, second data representative of a second acoustic wave to cancel; and controlling, by the system, the actuator to adjust the variable dimensions of the group of Helmholtz resonator unit cells, based on a second frequency of the second acoustic wave, to resonate the group of Helmholtz resonator unit cells to cancel second noise comprised by the second acoustic wave.

* * * * *